United States Patent Office 3,509,076
Patented Apr. 28, 1970

3,509,076
POLYMERS AND PROCESS FOR MAKING SAME
James J. Anderson, Richmond, Va., assignor to Mobil Oil Corporation, a corporation of New York
No Drawing. Continuation-in-part of application Ser. No. 580,608, Sept. 20, 1966, which is a continuation-in-part of application Ser. No. 276,102, Apr. 26, 1963. This application Sept. 23, 1968, Ser. No. 761,842
Int. Cl. C08g 22/30
U.S. Cl. 260—2.5            27 Claims

ABSTRACT OF THE DISCLOSURE

Cellular fire-retardant polyurethanes of improved dimensional stability when heated and resisting splitting while foaming are formed by reacting an organic polyisocyanate with a polyol and an oxyalkylated phosphorus acid in the presence of a neutral phosphorus compound.

RELATED APPLICATIONS

This application is a continuation-in-part of application Ser. No. 580,608, filed Sept. 20, 1966 which, in turn, is a continuation-in-part of application Ser. No. 276,102, filed Apr. 26, 1963. Each application has been abandoned.

This invention relates to cellular polyurethanes having improved fire-retardant and self-extinguishing properties and, more particularly, to such cellular polyurethanes having improved dimensional stability properties permitting them to withstand adverse conditions including excessive heat, humidity, etc., over a period of time, and to a process for forming the same.

Polyurethane polymers and processes for their manufacture and for their transformation into foamed rigid, semi-rigid, and flexible materials are well known. These polymers are formed by the reaction of a polyol containing at least two active hydrogen atoms per molecule, such as polyesters and polyethers, with an organic polyisocyanate, preferably an organic diisocyanate or a polymeric isocyanate.

In a known process for making a cellular polyurethane, the polyol is reacted with an excess of organic polyisocyanate to form a prepolymer containing unreacted NCO groups. Normally, from 5 to 48% excess is used, with the amount depending on the viscosity desired and the method of foaming. In one method, the foaming of the polyurethane product is obtained by the addition of water, a catalyst, and additional active hydrogen compounds, such as additional polyols. The water reacts with the isocyanate to generate carbon dioxide which, in turn, is trapped in the viscous mass as the reaction proceeds. The catalyst promotes crosslinking of the polymer chains and, as the foaming mass expands and reaches the point of setting, or curing, the mass comprises a plurality of tiny cells.

In another method of foaming, usually less of the excess polyisocyanate is required, and the cellular structure is obtained by use of a low-boiling, inert liquid which is added at the same time as the catalyst and the additional active hydrogen compound. As the reaction proceeds, heat is generated and the low-boiling inert liquid is vaporized. This vapor is trapped in the viscous mass and setting takes place as described previously. Other methods of preparing the foamed urethanes polymers are also known, including the "one-shot" method.

A basic process for forming polyurethanes and polyurethane foams wherein the products have fire-retardant properties, which comprises replacing all or part of the conventional polyol reactant with a phosphorus compound having at least two active hydrogen atoms per molecule, and reacting the phosphorus compound and any remaining polyol with an organic polyisocyanate, is described in a copending application of Charles L. Harowitz, Ser. No. 807,328, filed Apr. 20, 1959. Applicant incorporates herein by reference all of the disclosure in the aforesaid Harowitz application is being "prior art" and for the purpose of supporting any and all terminology used in the present application and appended claims.

It has now been discovered that many cellular fire-retarding polyurethanes comprising the reaction product of an organic polyisocyanate with a mixture of a polyol and a phosphorus compound having at least two active hydrogen atoms, such as an oxyalkylated dialkyl pyrophosphoric acid, if subjected to excessive heat or to relatively high heat and high relative humidity for a period of time, show a significant loss in dimensional stability, i.e., a number of cells become ruptured and the foam deteriorates so as to show a significant loss in desirable characteristics.

It has also been found that many cellular fire-retarding polyurethane foams comprising the reaction product of an organic polyisocyanate and a polyol will develop excessive splitting when the foam has therein a phosphorus fire-retardant additive such as a trialkyl phosphate, a trialkyl phosphonate, or a trialkyl phosphinate wherein the alkyl of each taken together, contain up to a total of 15 carbon atoms.

Accordingly, it is an object of this invention to provide a process for improving the dimensional stability properties of cellular polyurethane products made fire-retarding with phosphorus compounds.

It is a further object of this invention to provide a process for improving cellular polyurethane products made fire-retarding with phosphorus compounds, which process greatly lessens, or eliminates entirely, the products' tendency to split.

Another object of this invention is to provide a process for forming a foamed fire-retarding polyurethane having improved dimensional stability and which is capable of withstanding elevated temperatures and humid atmospheric conditions over a given period of time.

Still another object of this invention is to provide a cellular fire-retarding polyurethane resin having at least one of the phosphorus compounds as an integral part of its chemical structure, which resin when foamed has the ability to resist deterioration when subjected to heat and to heat and highly humid atmospheric conditions.

In attaining the objects of this invention, one feature resides in reacting a polyisocyanate with a polyol and a reactive phosphorus compound containing at least two active hydrogen atoms per molecule, such as an oxyalkylated dialkyl pyrophosphoric acid, while having present in the reaction mixture a sufficient amount of a neutral trialkyl phosphate, trialkyl phosphonate, or trialkyl phosphinate to impart improved dimensional stability properties to the foamed polyurethane product.

A further feature resides in reacting the organic polyisocyanate with a polyether or polyester polyol and an oxypropylated dibutyl pyrophosphoric acid while having present in the reaction mixture a neutral phosphorus compound selected from the group consisting of trialkyl phosphate, trialkyl phosphonate, and trialkyl phosphinate in an amount of from about 10 to about 90% by weight based on the combined weight of the reactive and neutral phosphorus compounds.

Other objects, features and advantages of the invention will become more apparent from the following description thereof.

Three foamed polyurethane compositions prepared from the following batches:

TABLE I

| Example | Parts by weight | | |
|---|---|---|---|
| | 1 | 2 | 3 |
| Ingredients: | | | |
| (1) Sorbitol polyether polyol (OH No. of 620) | 160.0 | 184.0 | 195.0 |
| (2) L-520 | 6.0 | 6.0 | 6.0 |
| (3) Oxypropylated dibutyl pyrophosphoric acid | 127.0 | 55.9 | 23.5 |
| (4) Dimethylethanolamine | 2.4 | 2.4 | 2.4 |
| (5) Stannous octoate | 1.2 | 1.2 | 1.2 |
| (6) Dimethyl methyl phosphonate | 0.0 | 30.1 | 43.5 |
| (7) Freon-11 | 89.0 | 85.0 | 77.0 |

(2) L-520, as described in U.S. Patent 3,251,785 is a dimethyl siloxane glycol copolymer of the formula

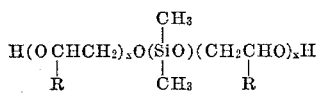

(3) is prepared by reacting substantially one mole of $P_2O_5$ with two moles of butyl alcohol, followed by neutralization of the acid functions with propylene oxide.

(7) is a trichlorofluoromethane, a known foaming agent for polyurethane foams.

Each of the foamed products was formed by mixing all of the ingredients at room temperature and stirring. Each mixture was then added, still at room temperature, to 250 parts by weight of crude tolylene diisocyanate and the mixture poured into molds. An exothermic reaction ensued almost immediately, and the mold containing the foaming mixture were placed in an oven maintained at 70° C. for 10 minutes, which was sufficient to cure the products, i.e., for the reaction to go to completion.

Twelve 1" x 2" x 4" samples, four from each of the foams, were cut. One sample from each foam was placed in an oven maintained at 110° C., one sample from each was placed in an oven maintained at 120° C., and so on. Results were measured at the completion of the 24-hour period at the designated temperature, and the results are expressed in terms of percentage of change in the original volume of the foam, in the following table.

TABLE II

| | Percent change after 24 hours | | |
|---|---|---|---|
| | Example 1 | Example 2 | Example 3 |
| At temperature of: | | | |
| 110° C | 47 | 4 | 1 |
| 120° C | (9) | 16 | 3 |
| 130° C | -4 | (5) | 14 |
| 140° C | -7 | -5 | 16 |

Other samples cut from the same original foams were placed in a chamber maintained at a temperature of 158° F. and 95 to 100% relative humidity, and results were measured at the intervals set forth in Table III. Again the results are expressed in percent of change in the original volume of the foam.

TABLE III

| | Percent change at 158° F., 100% R.H. | | |
|---|---|---|---|
| | Example 1 | Example 2 | Example 3 |
| After: | | | |
| 1 day | 7 | 12 | 5 |
| 2 days | 10 | 13 | 10 |
| 4 days | (-6) | 12 | 7 |
| 7 days | -8 | 17 | 5 |
| 14 days | -12 | 20 | 8 |
| 42 days | -32 | (9) | 12 |

As may be seen with respect to Example 1, Table II, the volume of the foam increases 47% when held at a temperature of a 110° C. for a period of 24 hours. When the foam is treated at a temperature of 120° C. for 24 hours, the apparent increase in volume over the starting material is now only 9%. In other words, the volume has supposedly increased to at least 47% of its original volume and then has decreased so that it is now only 9% greater than that of the starting material. Thus, somewhere between the temperature of 120° C. and 110° C. is the "critical temperature," i.e., the temperature at which most of the blowing agent has been lost and the foam is well along in its process of decomposition. In Example 2, Table II, the critical temperature—designated in all cases by ( )—has now increased to 130° C., and to above 140° C. in Example 3. Thus, the presence of the dimethyl methyl phosphonate results in improved dimensional stability of the product. Again, as may be seen in Table III, while the presence of the phosphonate increases the stability of the foam, the product of Example 3 is the most stable form.

Further cellular products were made in the manner described above, except that they were of the following compositions:

TABLE IV

| Example | Parts by weight | | |
|---|---|---|---|
| | 4 | 5 | 6 |
| Ingredients: | | | |
| (1) Sucrose polyether polyol (OH No. of 450) | 220.0 | 252.0 | 266.0 |
| (2) L-520 | 6.0 | 6.0 | 6.0 |
| (3) Oxypropylated dibutyl pyrophosphoric acid | 118.0 | 52.6 | 22.7 |
| (4) Triethylene diamine | 2.4 | 2.4 | 2.4 |
| (5) Stannous octoate | 1.2 | 1.2 | 1.2 |
| (6) Dimethyl methyl phosphonate | 0.0 | 28.4 | 42.3 |
| (7) Freon-11 | 98.0 | 94.0 | 90.0 |

Strips of foam were cut from each of the products of Examples 4, 5 and 6, and subjected to the same heat aging tests as were the strips of Examples 1, 2 and 3. The results are set forth in the following tables:

TABLE V

| | Percent change after 24 hours | | |
|---|---|---|---|
| | Example 4 | Example 5 | Example 6 |
| At temperature of: | | | |
| 110° C | 11 | 11 | 2 |
| 120° C | 32 | 19 | 4 |
| 130° C | (-2) | 14 | 11 |
| 140° C | -2 | (2) | 10 |
| 150° C | | -2 | 8 |

TABLE VI.—HEAT AGING

| | Percent change at 158° F., 100% R.H. | | |
|---|---|---|---|
| | Example 4 | Example 5 | Example 6 |
| After: | | | |
| 1 day | 15 | 12 | 7 |
| 2 days | 19 | 14 | 10 |
| 4 days | 10 | 15 | 11 |
| 7 days | (4) | 15 | 8 |
| 14 days | -4 | 15 | 15 |
| 42 days | -21 | (7) | 10 |
| 56 days | | | 10 |

As is evident from the foregoing tables, the presence of the phosphonate improved the dimensional stability properties of the foamed polyurethanes.

At the critical temperature, the polymer strength of the foams of Examples 1 and 4 was decreased to the point where many of the cells of the structure were ruptured, causing deterioration of the foam and making it lose its basic desirable characteristics. The foams of Examples 2, 3, 5 and 6, on the other hand, showed an ability to withstand higher temperatures than the foams of Example 1. Likewise, the foams of Examples 2, 3, 5 and 6 showed a many-fold improvement in their ability to withstand high temperatures under highly humid atmospheric conditions.

Polyurethane foams containing a trialkyl phosphate, trialkyl phosphonate, or trialkyl phosphinate as the sole additive to impart fire-retardant properties thereto, as illustrated in Table VII and the remarks thereon, have the undesirable characteristic of splitting at a plurality of places with crevices of varying length, width, and depth appearing therein. This splitting is particularly serious when the cellular polyurethanes are made in the shape of buns or other forms of relatively large volume.

It is not unusual in commercial practice to form a polyurethane bun of a height of from two or three feet, a width of five to six feet, and a length which can be of any size desired, particularly when a continuous operation is used in forming the product.

TABLE VII

| Example | Parts by weight | | |
|---|---|---|---|
| | 7 | 8 | 9 |
| Ingredients: | | | |
| (1) Tolylene diisocyanate [1] | 42.2 | 40.4 | 41.8 |
| (2) Sorbitol polyether (OH No. 620) | 34.2 | 32.8 | 32.6 |
| (3) Oxypropylated dibutyl pyrophosphoric acid | | | 3.9 |
| (4) Dimethyl methylphosphate | 9.1 | | 7.3 |
| (5) Diethyl ethylphosphonate | | 12.1 | |
| (6) Trichlorofluoromethane | 13.0 | 13.2 | 12.9 |
| (7) Dimethylethanolamine | 0.4 | 0.4 | 0.4 |
| (8) Dibutyl tin dilaurate | 0.2 | 0.2 | 0.2 |
| (9) Silicone surfactant | 1.0 | 1.0 | 1.0 |

[1] A crude tolylene diisocyanate sold by Allied Chemical Corporation under the Tradename Nacconate 4040, National Aniline Bulletin "One-Shot Polyether Rigid Polyurethane Foams Based On Nacconate 4040", May 27, 1960.

Foams of Examples 7, 8 and 9 were prepared in the manner already described, except they were of the compositions shown in Table VII. Visual observation showed splitting to be severe in the foams of Examples 7 and 8, but non-existent to very slight in the Example 9 foam.

Additional illustrative examples are shown in Table VIII following wherein an oxypropylated phosphoric acid and an oxypropylated methyl phosphonic acid are shown to be suitable oxyalkylated phosphorus acids having at least two active hydrogen atoms. Table VIII follows.

wherein R represents H, $CH_3$, and $C_2H_5$ and $CH_2Cl$, with the phosphorus acid compound to form the oxyalkylated product of the acid. With respect to the alkyl esters of phosphorus acids, the alkyl group of the acids is preferably a lower alkyl having up to six to eight carbon atoms, since these are more readily available commercially.

Whereas only methyl dimethyl- and ethyl diethylphosphonate have been shown, trialkyl phosphates, trialkyl phosphonates and trialkyl phosphinates, and the halo-substituted alkyl members thereof, useful for the purposes of this invention include those having a total of up to 15 carbon atoms in the molecule, preferably from three to about nine carbon atoms therein. When used in combination with reactive phosphorus compounds, the named neutral phosphorus compounds containing in excess of a total of 15 carbon atoms actually detract from the improvement in dimensional stability when compared to those containing 15 carbon atoms and below.

Representative of neutral phosphorus compounds coming within the preferred range of from a total of three to a total of about nine carbon atoms are trimethyl phosphate, triethyl phosphate, tripropyl phosphate, dimethyl methylphosphonate, diethyl ethylphosphonate, methyl dimethylphosphinate, ethyl diethylphosphinate, and propyl dipropylphosphinate, tris(2-chloroethyl) phosphate, tris(dibromopropyl) phosphate, dimethyl trichloromethylphosphonate, and 2-chloroethyl dimethylphosphinate.

The polyol which may be used in conjunction with the reactive phosphorus compound to react with the poly-

TABLE VIII

| Example | Parts By Weight | | | | | |
|---|---|---|---|---|---|---|
| | 1397 | 1397A | 1397B | 1398 | 1398A | 1398B |
| Ingredients: | | | | | | |
| (1) Tolylene diisocyanate [a] | 39.8 | 41.3 | 41.7 | 43.1 | 42.5 | 42.3 |
| (2) Sorbitol polyether polyol [b] | 12.8 | 27.0 | 31.4 | 21.9 | 28.4 | 31.7 |
| (3) Dimethyl methylphosphonate | | 6.0 | 7.8 | | 4.8 | 7.3 |
| (4) Oxypropylated $H_3PO_4$ [c] | 32.8 | 11.1 | 4.2 | | | |
| (5) Oxypropylated $CH_3\overset{O}{\overset{\|}{P}}(OH)_2$ [d] | | | | 19.8 | 9.2 | 3.8 |
| (6) Trichlorofluoromethane | 13.5 | 13.5 | 13.5 | 13.8 | 13.5 | 13.5 |
| (7) Dimethylethanol amine | 0.4 | 0.4 | 0.4 | 0.4 | 0.4 | 0.4 |
| (8) Dibutyl tin dilaurate | 0.2 | 0.2 | 0.2 | 0.2 | 0.2 | 0.2 |
| (9) Silicone surfactant | 0.6 | 0.7 | 0.7 | 0.7 | 0.7 | 0.7 |
| Heat aging, percent change (volume) after 24 hrs. at— | | | | | | |
| 110° C | 80.9 | 8.4 | 4.8 | 4.3 | 2.3 | 3 |
| 120° C | (6.2) | 25.2 | 8.8 | 20.7 | 7.6 | 7.3 |
| 130° C | −3.2 | 25.5 | 26.7 | 34.7 | 37.7 | 24.0 |
| 140° C | −9.4 | (+12) | (+16) | (5.9) | (+16.4) | 25.2 |
| Hydrolytic aging, percent change (volume) at 158° F., 100% R.H. after— | | | | | | |
| 1 day | (−6.2) | 7.8 | 5.1 | 11.4 | 7.7 | 2.5 |
| 2 days | −6.2 | 10.5 | 6.4 | 16.2 | 8.9 | 2.5 |
| 4 days | −8.8 | 13.1 | 8.0 | 24.0 | 10.2 | 2.5 |
| 7 days | −11.2 | | | (22.5) | | |

[a] Nacconate 4040.   [b] OH No.=612.   [c] OH No.=375; percent P=6.9.   [d] OH No.=400; percent P=11.3.

When the proportion of trialkyl phosphate, trialkyl phosphonate, or trialkyl phosphinate is within the range of from about 10 to about 90% (and particularly when it is from about one-third to two-thirds) by weight of the combined weight of the reactive and neutral phosphorus compounds, not only do the resulting foams have superior dimensional stability properties when subjected to increasingly high temperatures or high temperatures under humid atmospheric conditions, but the splitting which ordinarily occurs in the foams due to the presence of the neutral phosphorus compounds alone is either drastically decreased or eliminated entirely, depending upon the particular ingredients used in making the foams, the proportions thereof, and other factors.

While the invention has been exemplified by use of oxypropylated dibutyl pyrophosphoric acid, oxypropylated phosphoric acid and oxypropylated methyl phosphonic acid, it is to be understood that various oxyalkylated phosphorus acids can be substituted therefor. These are prepared by reacting an alkylene oxide having the formula

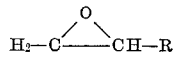

isocyanate may be any one of the conventional polyols used in the formation of polyurethanes, and include the reaction products of polybasic acids such as adipic, phthalic, sebacic, succinic, oxalic, ricinoleic, and the like, with a polyhydric alcohol such as ethylene, diethylene, propylene, and butylene glycol, 1,4-butane diol, glycerol, trimethylol propane, trimethanol ethane, 1,2,6-hexane triol, 1,2,4-butane triol, and the like. Polyalkylene ether glycols may also be used. The sucrose polyether polyol having an OH number of 450 and the sorbitol polyether having an OH number of 620, each prepared from the appropriate polyhydroxy compound and propylene oxide, have been used in the above examples, but only as being representative of the variety of polyols which may be used. A number of polyisocyanates are known for the formation of polyurethanes, and any of these known polyisocyanates may be employed for the purposes of this invention. Especially useful are the aromatic diisocyanates and the polymeric isocyanates such as polymethylene polyphenylisocyanate. A good discussion of polyurethanes is contained in the book entitled "Polyurethanes" by Bernard A. Dombrow, Reinhold Publishing Corporation, New York, 1957.

As described in the copending Harowitz application Ser. No. 807,328, the amount of active phosphorus compound containing at least two active hydrogen atoms which may replace a portion of the conventional polyol in the known polyolpolyisocyanate polyurethane reaction in order to impart flame-retardant properties to the resulting product, is from about 5 to 70% of the polyol based upon active hydrogen equivalents. Thus, the amount of active hydrogen furnished by the aforesaid phosphorus compound is substantially equivalent to the amount of active hydrogen of the polyol which it replaces in the reaction mixture. The amount of neutral phosphate, phophonate or phosphinate which is provided in the reaction mixture is, as previously disclosed, based upon the combined weight of the active and neutral phosphorus compounds.

Polyurethane products made in accordance with the invention have a number of uses, including paneling for structures such as airplanes, buildings, etc., as insulation, and the like. Because of the improved stability properties, the foams of the present invention may also be used in those places where atmospheric conditions are extremely humid and/or temperatures are sufficiently high to deteriorate conventional fire-retarding polyurethane foams containing a phosphorus compound as an integral chemical part of the foam structure. The fire-retardant properties of each of the products made in accordance with the present invention were excellent when tested in accordance with the provisions and requirements set forth in ASTMD–1692.

What is claimed is:

1. A cellular fire-retardant polyurethane having improved dimensional stability properties when subjected to heat, and having the ability to resist splitting while foaming, comprising the reaction product formed by reaction of an organic polyisocyanate with a polyol selected from the group consisting of polyester and polyether polyols and a reactive phosphorus compound having at least two active hydrogen atoms per molecule in the presence of a low boiling inert foaming agent, said reactive phosphorus compound being the oxyalkylated product of reaction between phosphoric acid, a dialkyl pyrophosphoric acid or an alkyl phosphonic acid, and an alkylene oxide having the formula

wherein R is selected from the group consisting of H, $CH_3$, $C_2H_5$ and $CH_2Cl$, there being present in said reaction a neutral phosphorus compound selected from the group consisting of trialkyl phosphate, trialkyl phosphonate, trialkyl phosphinate, and the halo-alkyl members thereof, the said alkyls of each of said neutral phosphorus compounds, taken together, containing not more than about 15 carbon atoms, said neutral phosphorus compound being present in an amount of from about 10 to about 90% by weight of the combined weights of the said reactive and neutral phosphorus compounds, and said foaming agent being present in an amount of from about 28 to about 36% by weight of the combined weights of the said polyol and said reactive phosphorus compound.

2. The polyurethane of claim 1 in which the said reactive phosphorus compound is an oxyalkylated dialkyl pyrophosphoric acid present in an amount of from about 5 to about 70% of said polyol based upon acid hydrogen equivalents.

3. The polyurethane of claim 2 wherein said oxyalkylated dialkyl pyrophosphoric acid is oxypropylated dibutyl pyrophosphoric acid.

4. The polyurethane of claim 2 wherein the alkyls of the neutral phosphorus compound, taken together, have a total of from three to about nine carbon atoms.

5. The polyurethane of claim 3 wherein the alkyls of the neutral phosphorus compound, taken together, have a total of from three to about nine carbon atoms.

6. The polyurethane of claim 5 wherein the neutral phosphorus compound is dimethyl methylphosphonate.

7. The polyurethane of claim 5 wherein the neutral phosphorus compound is diethyl ethylphosphonate.

8. The polyurethane of claim 5 wherein the neutral phosphorus compound is methyl dimethylphosphinate.

9. The polyurethane of claim 5 wherein the neutral phosphorus compound is propyl dipropylphosphinate.

10. The polyurethane of claim 5 wherein the neutral phosphorus compound is trimethyl phosphate.

11. The polyurethane of claim 5 wherein the neutral phosphorus compound is triethyl phosphate.

12. The polyurethane of claim 1 wherein the polyisocyanate is tolylene diisocyanate.

13. In the process of forming a fire-retardant foamed polyurethane product comprising reacting an organic polyisocyanate with a polyol selected from the group consisting of polyester and polyether polyols and a reactive phosphorus compound having at least two active hydrogen atoms per molecule, and foaming the resulting reaction product in the presence of a low boiling inert foaming agent in an amount of from about 28 to about 36% by weight of the combined weights of the said polyol and said reactive phosphorus compound, the improvement which comprises including in the reaction prior to foaming (1) as the reactive phosphorus compound an oxyalkylated product of reaction between phosphoric acid, a dialkyl pyrophosphoric acid or an alkyl phosphonic acid, and an alkylene oxide having the formula

wherein R is selected from the group consisting of H, $CH_3$, $C_2H_5$ and $CH_2Cl$, which reactive phosphorus compound imparts fire-retardant properties to said foamed polyurethane product but which reduces dimensional stability of said foamed polyurethane product when said foamed product is subjected to elevated temperatures and to elevated temperatures in the presence of high relative humidity, when so used in the absence of (2) and (2) a neutral phosphorus compound selected from the group consisting of trialkyl phosphate, trialkyl phosphonate, trialkyl phosphinate, and halo-alkyl members thereof, the said alkyls of each of said neutral phosphorus compounds, taken together, containing not more than a total of about 15 carbon atoms, said neutral compound being present in an amount of from about 10 to about 90% by weight of the combined weight of said reactive and neutral compounds, said neutral phosphorus compound imparting dimensional stability to said foamed polyurethane product, whereby said foamed polyurethane product is fire-retardant, has dimensional stability when so subjected to all of said elevated temperatures and has the ability to resist splitting when being foamed.

14. The process of claim 13 wherein the said reactive phosphorus compound is an oxyalkylated dialkyl pyrophosphoric acid present in an amount of from about 5 to about 70% of said polyol based upon active hydrogen equivalents.

15. The process of claim 14 wherein the said oxyalkylated dialkyl pyrophosphoric acid is oxypropylated dibutyl pyrophosphoric acid.

16. The process of claim 14 wherein the alkyls of the neutral phophorus compound, taken together, contain a total of from three to about nine carbon atoms.

17. The process of claim 15 wherein the alkyls of the neutral phosphorus compound, taken together, contain a total of from three to about nine carbon atoms.

18. The process of claim 17 wherein the said neutral phosphorus compound is dimethyl methylphosphonate.

19. The process of claim 17 wherein the said neutral phosphorus compound is diethyl ethylphosphonate.

20. The process of claim 17 wherein the said neutral phosphorus compound is trimethyl phosphate.

21. The process of claim 17 wherein the said neutral phosphorus compound is triethyl phosphate.

22. The process as defined in claim 13 wherein the polyisocyanate is tolylene diisocyanate.

23. The process as defined in claim 13 wherein the reaction mixture contains a foaming agent.

24. The polyurethane of claim 1 wherein said reactive phosphorus compound is oxypropylated phosphoric acid.

25. The polyurethane of claim 1 wherein said reactive phosphorus compound is oxypropylated methyl phosphonic acid.

26. The process of claim 13 wherein said reactive phosphorus compound is oxypropylated phosphoric acid.

27. The process of claim 13 wherein said reactive phosphorus compound is oxypropylated phosphonic acid.

References Cited

UNITED STATES PATENTS

| | | | |
|---|---|---|---|
| 3,034,996 | 5/1962 | Kaplan | 260—2.5 |
| 3,257,337 | 6/1966 | Schoepfle et al. | 260—2.5 |
| 3,402,132 | 9/1968 | Pelletier et al. | 260—2.5 |

FOREIGN PATENTS

| | | |
|---|---|---|
| 598,678 | 12/1960 | Belgium. |
| 954,792 | 4/1964 | Great Britain. |

DONALD E. CZAJA, Primary Examiner

W. E. PARKER, Assistant Examiner

U.S. Cl. X.R.

260—45.7, 75, 77.5

PO-050
(5/69)

UNITED STATES PATENT OFFICE
CERTIFICATE OF CORRECTION

Patent No. 3,509,076      Dated April 28, 1970

Inventor(s) James J. Anderson

It is certified that error appears in the above-identified patent and that said Letters Patent are hereby corrected as shown below:

Column 2, line 7, "is" should be read --as--.
Column 5, line 13 (line 6 of Table VII), "methylphosphate" should be read --methylphosphonate--.
Column 5, line 50 (note c under Table VII), "375" should be read --365--.
Column 6, in Table VIII, last column, eleventh line under heading "1398B", "7.3" should be read --6.3--.
Column 5, line 62, "along" should be read --alone--.
Column 7, line 30, "ASTMD-1692" should be read --ASTM-D-1692--.

SIGNED AND
SEALED
OCT 13 1970

(SEAL)
Attest:

Edward M. Fletcher, Jr.
Attesting Officer

WILLIAM E. SCHUYLER, JR.
Commissioner of Patents